United States Patent [19]
Lux et al.

[15] 3,685,894
[45] Aug. 22, 1972

[54] PHOTOELECTROSTATIC COPYING MACHINE HAVING LAMPS FOR EXPOSING COPY MARGINS

[72] Inventors: George K. Lux, San Jose, Calif.; James B. Ellis, Chicago; John J. Schulze, Prospect Heights, both of Ill.

[73] Assignee: Addressograph-Multigraph Corporation, Mount Prospect, Ill.

[22] Filed: Feb. 10, 1970

[21] Appl. No.: 14,885

Related U.S. Application Data

[62] Division of Ser. No. 699,507, Jan. 22, 1968, Pat. No. 3,556,655.

[52] U.S. Cl. ............................355/3, 355/8, 355/11
[51] Int. Cl. ............................................G03g 15/00
[58] Field of Search........................................355/8, 3

[56] References Cited

UNITED STATES PATENTS

3,388,644  6/1968  Granzow et al...............355/11

Primary Examiner—John M. Horan
Assistant Examiner—Kenneth C. Hutchison
Attorney—Mason, Kolehmainen, Rathburn & Wyss

[57] ABSTRACT

A photoelectrostatic copying machine selectively makes full size or reduced size copies of an original sheet. movement of a size selection switch to the reduced size position adjusts an optics assembly to project a reduced size light image of an illuminated original sheet onto a copy sheet at an exposure station, and alters the speed of movement of the copy sheet relative to the original sheet. In order to prevent non-exposure of marginal areas of the copy sheet, edge exposure lamps, masked to expose only edge portions of the sheet, are energized automatically when the machine is conditioned for reduced size copymaking operation.

3 Claims, 8 Drawing Figures

Fig. 8

PHOTOELECTROSTATIC COPYING MACHINE HAVING LAMPS FOR EXPOSING COPY MARGINS

This application is a division of copending application, Ser. No. 699,507, filed Jan. 22, 1968, now U.S. Pat. No. 3,556,655.

The present invention relates to a photoelectrostatic copying machine and has for a primary object the provision of an improved copying machine capable of automatically producing both full size and reduced size copies of an original.

Various types of automatic copy making machines for producing copies of graphic originals on photoconductive material are known. In such machines, the photoconductive material may comprise a coating on a paper copy sheet or a layer of photoconductive material on a metal member such as a drum. In an automatic copy making operation a graphic original such as an original sheet is moved past a light source, and a light image corresponding to the graphic image is projected through an optics assembly onto a moving photoconductive member. Prior to exposure, the photoconductive surface of the member is charged, and when the surface is struck by light reflected from the original, the charge is selectively dissipated to form a pattern of charged and discharged areas corresponding to the original image. This charge image is then developed by the application of a suitable developer material such as a finely divided powder and the developed image, in the case of a photoconductive copy sheet, is rendered permanent by suitable fusing or fixing apparatus. In the case of a metal drum, the powder image may be transferred to a paper sheet and then bonded to the sheet. One example of an automatic copy making machine of this type can be found in the co-pending application of John L. Tregay and Kristian L. Helland, Ser. No. 389,037, filed Aug. 12, 1964, now U.S. Pat. No. 3,398,259.

Although most copying machines produce a copy substantially equal in size to the original, machines have been developed for producing copies of reduced size. In such machines, the optics assembly is designed so that the reflected light image projected upon the photoconductive member is smaller than the original image. In addition, if the machine is of the type wherein both the original and the photoconductive member are moved during the illumination-exposure process, the original is moved faster than the photoconductive member at a predetermined speed. One example of a machine for producing a reduced size copy may be found in the co-pending application of Daniel B. Granzow, George K. Lux, and Stanley A. Gawron, Ser. No. 440,178, filed Mar. 16, 1965, now Pat. No. 3,388,644.

Although the machines described in the above identified co-pending applications have proven to be highly satisfactory for their intended uses, it is an important object of the present invention to provide an improved automatic copying machine capable not only of producing copies equal in size to the original but also capable of producing copies differing in size from the original.

Another object is to provide a machine including a single control means for automatically conditioning the machine for either type of operation.

A further object is to provide an improved lens assembly for a copy making machine for producing copies of various sizes.

Yet another object is to provide a novel drive system for a copy making machine for propelling an original sheet and a copy sheet through the machine at various relative speeds.

A further object is to provide a novel control arrangement for simultaneously controlling the lens assembly and the drive system of an automatic copying machine for producing both full size and reduced size copies of an original.

Another object is to provide novel apparatus for preventing the adherence of developer material to marginal regions of a photoconductive member when reduced size copies are made.

Still a further object is to provide a compact and versatile copying machine for making different size copies of an original which has an optical path between the illuminating and exposure stations of a fixed length, thus obviating the need to movably mount the stations.

In brief, the above and other objects and advantages of the present invention are realized in one embodiment of the invention by the provision of a copy making machine including a drive system for moving an original sheet past a fixed illumination station and simultaneously moving a copy sheet past a fixed exposure station. A light source at the illumination station illuminates the original to produce a light image which is projected along an optical path of a fixed length onto the copy sheet at the exposure station by means of an optics assembly including an adjustable lens assembly. In accordance with one important feature of the invention, both the drive assembly and the adjustable lens assembly are operated by a single control means between one condition wherein the copy produced is equal in size to the original and another condition wherein a reduced size copy is produced.

Another aspect of the present invention resides in the provision of an improved adjustable lens assembly for use in producing both equal size and reduced size copies of the original. The lens assembly includes a rotatably mounted turret assembly including a pair of lenses selectively movable into the optical path of light reflected from the original onto the copy sheet for producing copies of different sizes. Fixed stop members are engaged by the rotatable turret assembly when the lenses are in proper position. The turret assembly is rotated by a motor energized automatically when the operator of the machine wishes to change the copy size. The motor is coupled to the turret assembly by means of a flexible and resilient shaft permitting the motor to overtravel with respect to the turret member after the turret member engages a stop, and also serving to urge the turret member firmly against the stop so that the lenses remain steady. The motor is automatically de-energized after a predetermined overtravel movement, and a brake operates automatically to hold the motor in position.

In accordance with another feature of the invention a novel drive system is provided for propelling the original and the copy sheet through the machine at equal or unequal speeds. A main drive motor is coupled to drive rollers which propel the copy sheet past the exposure station, and these drive rollers are operated continuously. During the operation of producing a copy sheet equal in size to the original, a first coupling means serves to rotate the original sheet drive rollers at the same speed as the copy sheet drive rollers. However, when a reduction mode of operation is selected, the first coupling means is automatically disengaged and a second coupling means together with a speed reduction assembly is used to operate the original sheet drive rollers at a faster speed than the copy sheet drive rollers and in proportion to the reduced light image. For example, if the reduced light image is 30 percent smaller than the original, the original is moved 30 percent faster than the copy sheet. Both coupling means are disengaged and a brake is engaged in order to stop the original drive rollers while the copy sheet drive rollers continue rotating.

In order to prevent dark marginal areas on the copy sheet which might otherwise be produced during reduced size copy making operations, a light source is positioned adjacent the exposure area for illuminating the outer edges of the copy sheet thereby to dissipate all charge thereon and to prevent the adherence of developer powder to these regions.

The invention, together with the above and other objects and advantages thereof, will best be understood from considering the following detailed description of one embodiment, in the course of which reference is made to the accompanying drawings, in which:

FIR. 4 is an enlarged view of the lens assembly of the machine.

Having reference now to the drawings, there are illustrated several portions of a photoelectrostatic automatic copying machine operable, in accordance with the present invention, to produce copies equal in size to a graphic original, or alternatively to produce reduced size copies. Many portions of the machine of the present invention, including those portions not illustrated in the drawings, may be similar to the machine described in the above mentioned co-pending application of John L. Tregay et al., and reference may be had to that application for an understanding of portions of the machine not here illustrated or described in detail.

In general, the machine serves to produce copies on photoconductive copy sheets of graphic original images carried on original sheets. The machine includes an illumination station generally designated as 20 (FIG. 1) where a moving original sheet is illuminated, as well as an exposure station generally designated as 22 where a charged photoconductive copy sheet is exposed by a light image reflected from the original. An optics assembly generally designated as 24 (FIG. 2) including an adjustable lens assembly generally designated as 26 (FIGS. 2 and 4—7) projects a reflected light image from the illuminated original sheet at the illumination station 20 onto the charged surface of the copy sheet at the exposure station 22. A drive system designated as a whole by the reference numeral 28 (FIGS. 1 and 3) serves simultaneously to propel the original sheet past the illumination station 20 and to propel the copy sheet past the exposure station 22.

In order to propel the original and copy sheets past the illumination and exposure stations 20 and 22, the drive system 28 includes original sheet drive rollers 30 and 32 located near the forward and rear edges of the illumination station 20, and a pair of copy sheet drive rollers 34 and 36 located near the forward and rear edges of the exposure station 22. Each drive roller is normally in contact with a corresponding idler roller (not shown) so that copy and original sheets are advanced by the drive rollers past the exposure station 22 and the illumination station 20, respectively.

When it is desired to make a copy, an original sheet is fed into the machine and is guided by suitable guide means (not shown) toward the illumination station 20. When the leading edge of the original reaches the drive rollers 30 at the entry end of the illumination station 20, it operates an original sheet sensing switch 38. As described in more detail hereinafter, operation of the original switch 38 by an original sheet causes the original sheet to be held stationary with its leading edge at the original drive roller 30 while a copy sheet is automatically advanced toward the exposure station 22 from a roll or stack in a copy sheet storage and supply enclosure (not shown).

A copy sheet entering the machine is moved by suitable drive and guide means (not shown) toward the illumination station. When the leading edge of the copy sheet reaches the copy sheet drive roller 34 at the entry end of the exposure station, the sheet operates a copy sheet sensing switch 40. In a manner described in more detail hereinafter, operation of the switch 49 by the copy sheet causes the copy sheet to be advanced past the exposure station 22 while the original sheet is advanced past the illumination station 20.

As described in considerably more detail in the above identified co-pending application of John L. Tregay et al., the copy sheet as it moves into the exposure station 22 is charged by means of a corona discharge assembly (FIG. 1) including a corona discharge wire 41 which deposits a charge on the photoconductive surface of the copy sheet. The exposure station is defined by a horizontally disposed plate or housing 42 having an aperture 44 therein through which reflected light is projected by the optics assembly 24 against the charged surface of the copy sheet. Suitable guiding means in the form of a taut wire 46 supports the copy sheet as it moves past the corona discharge wire 40 and the aperture 44.

The illumination station 20 is defined by a plate or housing 48 having an aperture 50 preferably closed by a transparent glass plate 52. As the original sheet moves across the glass plate 52, it is illuminated by means of a lamp 54 (FIGS. 1, 2, and 8) and a reflected light image is projected by the optics assembly 24 and adjustable lens assembly 26 onto the moving surface of the copy sheet through the aperture 44 at the exposure station 22.

As will be readily understood by those skilled in the art, illumination of the charged copy sheet results in selective dissipation of the charge in regions struck by light, so that there is produced on the surface of the sheet a charge pattern or image corresponding to the reflected light image. This charge image may be developed in any suitable fashion as by the application of a finely divided developer powder, and the developed powder image may be rendered permanent by fusing or fixing, as described in the above identified co-pending application of John L. Tregay, et al.

In accordance with a primary object of the present invention, the machine is capable not only of producing copies equal in size to the original but is also capable of producing copies of a reduced size. When a full size copy is produced, the reflected light image striking the copy sheet at the exposure station is equal in size to the graphic original image on the original sheet. Since both the original sheet and the copy sheet are moving during the illumination and exposure process, and since the reflected light image and the original image are equal in size, it is necessary for the original sheet and the copy sheet to move at the same speed through the illumination station 20 and the exposure station 22. However, when a reduced size copy is made, the reflected light image projected onto the copy sheet is smaller in size than the original image on the original sheet. Accordingly, in order to produce a reduced size copy, adjustment of the lens assembly 26 of the optics assembly 24 is required. In addition, since the reflected image is smaller than the original image, it is necessary for the original sheet to move past the illumination station 20 faster than the copy sheet moves past the exposure station 22, but at a predetermined speed. Furthermore, in order to center the reduced copy on the copy sheet it is desirable for the copy sheet to enter the exposure station before the original enters the illumination station.

In accordance with important features of the present invention, there are provided both the novel adjustable lens assembly 26 for automatically changing the size of the projected light image relative to the size of the original image, and also the novel drive system 28 capable of automatically moving the original and copy sheet either at the same speed or at different speeds. In addition, in accordance with a feature of the invention, there is provided means including a control circuit 56 (FIG. 8) controlling both the lens assembly 26 and the drive system 28 for automatically conditioning the machine for either full size or reduced size copy making operations in response to the operation of a single selector switch 58.

Proceeding now to a description of the drive system 28 (FIGS. 1 and 3) the system 28 may be conditioned to operate the original drive rollers 30 and 32 and the copy sheet drive rollers 34 and 36 at equal or unequal speeds, and to stop the original drive rollers 30 and 32 while the copy sheet drive rollers continue to rotate. In one mode of operation, when full size copies are made, a first electric clutch generally designated as 60 is energized while a second clutch generally designated as 62 and an electric brake generally designated as 64 are deenergized. In this mode of operation the original sheet is propelled past the illumination station 20 at the same rate of speed that the copy sheet is propelled past the exposure station 22. In a second mode of operation, the clutch 62 is energized while the clutch 60 and the brake 64 are de-energized. In this mode of operation, which is utilized during the reduced size copy making process, a speed reduction assembly generally designated as 66 is coupled between the copy sheet and the original drive rollers and the original sheet is propelled past the illumination station 20 faster than the copy sheet is propelled past the exposure station 22.

In a third mode of operation the brake 64 is energized while the clutches 60 and 62 are de-energized. This mode of operation is used while the original sheet is held stationary and the copy sheet is being advanced from the copy sheet supply enclosure, and also in the reduction process in order to center the copy on the copy sheet. In this mode, the copy sheet drive rollers 34 and 36 continue to rotate while the original sheet drive rollers 30 and 32 are held stationary.

Figure 1:
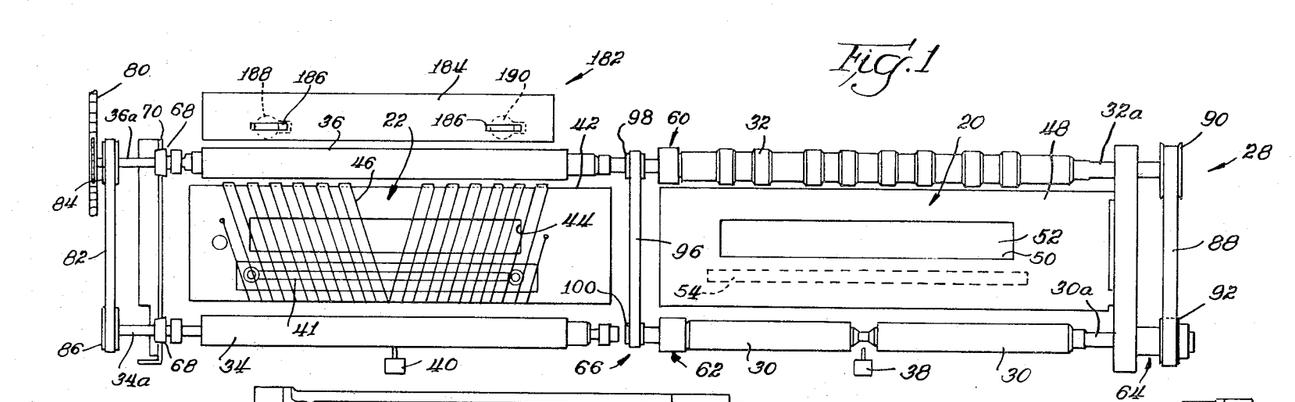
FIG. 1 is a fragmentary plan view of a portion of a copying machine constructed in accordance with the present invention, and illustrating the illuminating station, exposure station and drive system of the machine.
Figure 2:
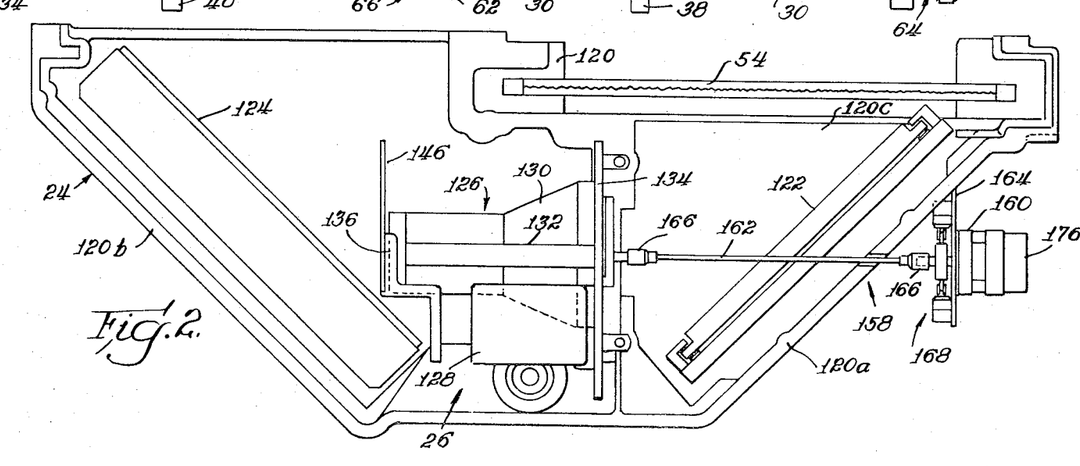
FIG. 2 is an elevational view of the optics assembly of the machine, and illustrating the adjustable lens assembly in simplified form.
Figure 3:
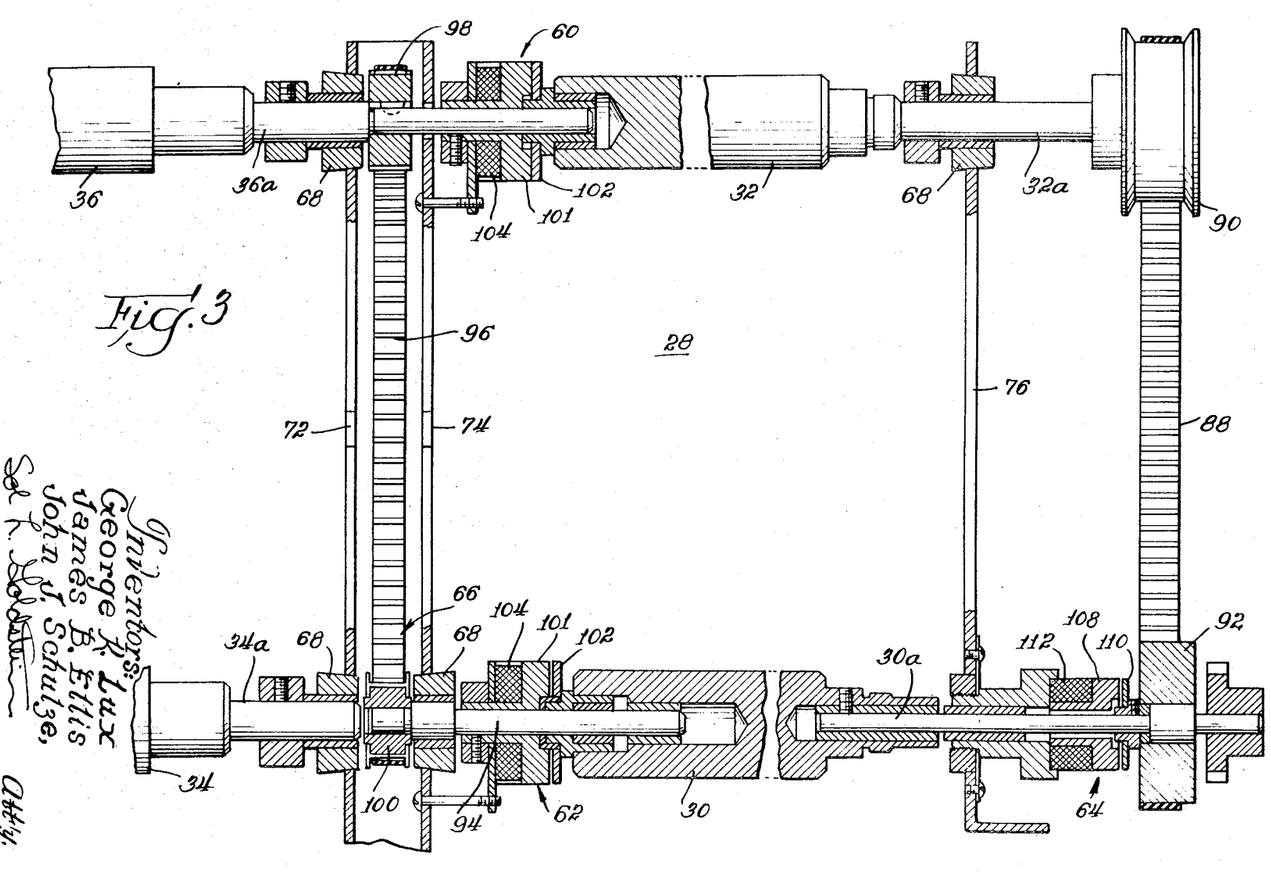
FIG. 3 is an enlarged, fragmentary, top view of the drive system of the machine shown partly in section.

More specifically, the sheet drive rollers 30, 32, 34, and 36 are secured respectively to shafts 30a, 32a, 34a, and 36a all of equal diameter and rotatably supported in a plurality of bearing assemblies 68 carried by fixed plates or walls 70, 72, 74, and 76 of the machine (see FIGS. 1 and 3). A main drive motor 78 (FIG. 8) operates continuously when the machine is on and continuously rotates the shaft 36a and the roller 36 by means of a chain and sprocket drive connection 80 (FIG. 1). The rollers 34 and 36 and shafts 34a and 36a are constrained to rotate at the same speed by means of a belt 82 running on a pair of pulleys 84 and 86 supported on the shafts 34a and 36a, and when the machine is on, the copy sheet drive rollers 34 and 36 operate continuously at a predetermined speed.

In order to rotate the original sheet drive rollers at the same speed as the copy sheet drive rollers during full size copying operations the clutch 60 coupled between the shafts 32a and 36a is energized, and the roller 32 is rotated at the same speed as the roller 36. The roller 30 and the shaft 30a are constrained to rotate at the same speed as the roller 32 and shaft 32a by means of a belt 88 running on pulleys 90 and 92 supported respectively on the shafts 30a and 32a.

In order to rotate the original sheet drive rollers 30 and 32 at a faster speed than the copy sheet drive rollers 34 and 36 during the process of making reduced size copies, the speed reduction assembly 66 is coupled between the rollers 36 and 30 by energization of the clutch 62. The speed reduction assembly 66 includes a speed reduction shaft 94 supported in one of the bearings 68 on the plate 74. The shaft 94 is constantly rotated by means of a belt 96 supported on a pair of pulleys 98 and 100 mounted respectively upon the shafts 36a and 94. The difference in angular velocity between these two shafts is determined by the difference in radius of the pulleys 98 and 100, this difference being chosen in accordance with the degree of size reduction desired in the reduced copy operating mode.

The electrically operated clutches 60 and 62 may be of any known construction, and are illustrated as including a pair of clutch plates 101 and 102 together with an operating winding 104 for magnetically causing the plates frictionally to engage one another upon energization of the winding. In the case of the clutch 60, the plate 101 is fixed to the continuously rotating shaft 36a while the plate 102 is fixed to the roller 32. Thus, upon energization of the winding 104 of clutch 60, the roller 32 rotates with the shaft 36a. Similarly, in the case of the clutch 62, the plate 101 is fixed to the continuously rotating shaft 94 while the plate 102 is fixed to the roller 30. Energization of the winding 104 of clutch 62 causes the roller 30 to rotate with the shaft 94.

As noted above, the novel drive system 28 also serves to stop the original drive rollers 30 and 32 while the copy sheet drive rollers 34 and 36 continue to rotate. This is accomplished by energization of the electric brake assembly 64 coupled between the fixed support plate 76 and the shaft 30a. The brake 64 includes a fixed plate 108 as well as a normally movable plate 110. Energization of a winding 112 of the brake causes the plate 110 to engage the plate 108 so that the shaft 30a, together with the rollers 30, shaft 32a and roller 32, are prevented from rotating.

Referring now to the optics assembly 24 and adjustable lens assembly 26, as illustrated in FIGS. 2 and 4–7 the optics assembly 24 includes a somewhat V-shaped housing 120 adapted to be supported within the copying machine in a vertical plane directly beneath the illumination station 20 and the exposure station 22. The housing 120 includes a pair of opposed angularly disposed walls 120a and 120b supporting a pair of mirrors 122 and 124. The illuminating lamp 54 is supported beneath the illuminating station 20, and a moving original passing over the plate 52 is illuminated by the lamp 54 and a light image is reflected by the mirror 122 through the lens assembly 26 and by the mirror 124 onto the moving copy sheet at the exposure station 22.

In accordance with one feature of the invention, the length of the stations 20 and 22 are fixed, the optical path between these stations is fixed, and the lens assembly 26 is adjustable to produce full size or reduced size copies. In general, the lens assembly 26 includes a rotatable turret assembly 126 supporting a full size lens unit 128 and a reduced size lens unit 130. The full size lens unit 128 is shown positioned at a predetermined point in the optical path in FIG. 6, and the reduced size lens unit 130 is shown positioned at a different predetermined point in the optical path in FIGS. 2, 4 and 7. As is readily understood by those skilled in the art, the focal length of these lens units is selected to provide the desired image size, and the positioning of these lens units in the optical path is governed by the length of the optical path and the focal length of the lens.

Referring now more specifically to FIGS. 4–7, the rotatable turret assembly 126 is supported on a turret shaft 132 rotatably supported between a plate 134 and a support arm 136 both secured to a vertical wall 120c of the optics housing 120. The lens 128 and the lens 130 are strapped to shaft 132 by bands 140 carried on a pair of supports 142 also attached to the shaft 132. Either of the lenses may be brought into alignment with an opening 144 (FIG. 6) in the plate 134, and thus into the path of light reflected between the original and copy sheet, by rotation of the turret shaft 132.

A light tunnel 138 places lens 130 in communication with the opening 144. When lens 128 moves into the optical path and lens 130 is moved to the displaced position shown in FIG. 6, the light tunnel 138 collects some extraneous light. A lens mask 146 mounted on the stationary arm 136 covers the rear end of lens 130 when lens 128 is used, and thereby prevents the extraneous light from passing into the exposure region.

Figure 4:
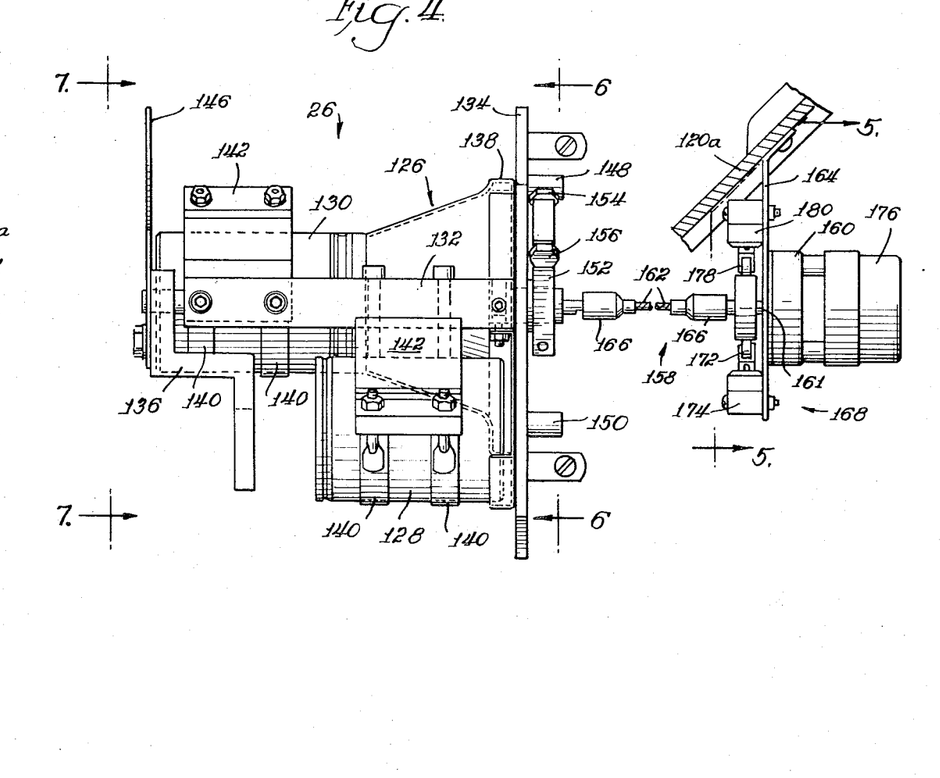
Figure 5:
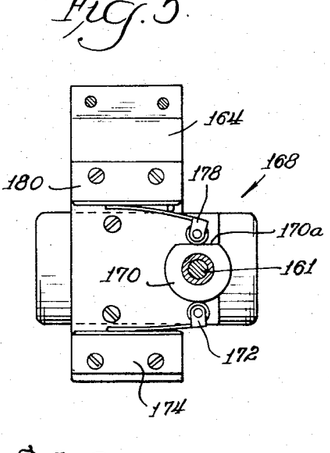
FIG. 5 is a sectional view taken along the line 5—5 of FIG. 4.
Figure 6:
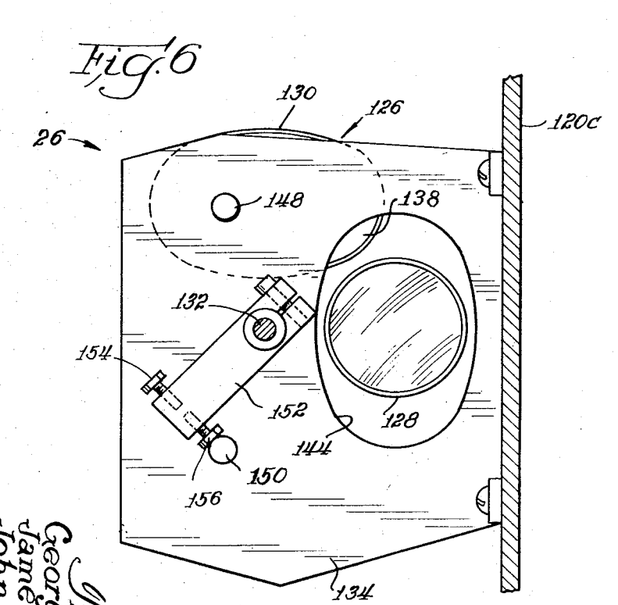
FIG. 6 is a sectional view taken along the line 6—6 of FIG. 4 with the lens assembly adjusted to provide full size copy.
Figure 7:
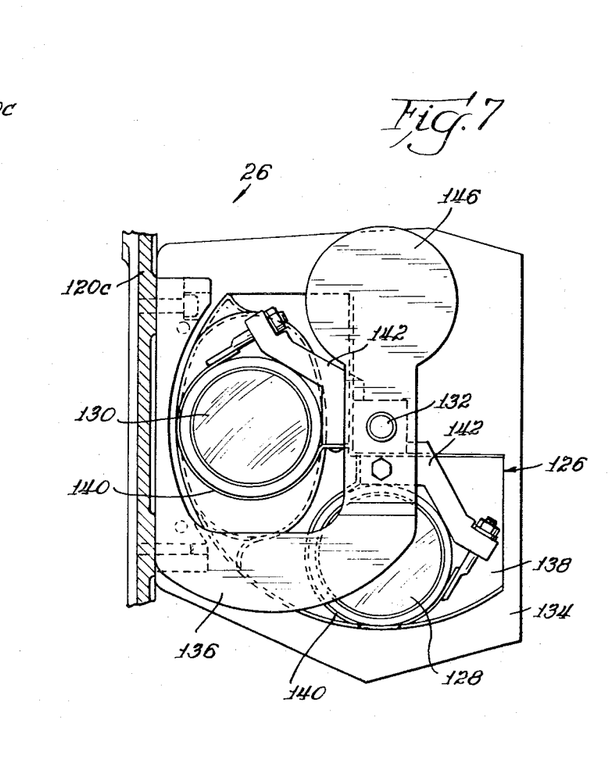
FIG. 7 is a rear elevational view of the lens assembly taken along line 7—7 of FIG. 4 with the lens assembly adjusted to provide reduced copy.

In order to precisely orient the rotatable turret assembly 126 for full size or reduced size copy making operations, a pair of stationary stop members 148 and 150 project from the fixed mounting plate 134 (FIGS. 4 and 6). The rotatable turret assembly 126 includes an indexing arm 152 attached to the turret shaft 132 provided with a pair of adjustable abutments 154 and 156 engageable with the stop members 148 and 150 when the lenses are properly positioned. More specifically, when full size copies are to be made the turret assembly is rotated to the position illustrated in FIG. 6 and the abutment 156 engages the stop 150. Conversely, when reduced size copies are made the turret assembly is rotated to the position shown in FIGS. 2, 4 and 7 wherein the abutment 154 engages the stop 148.

A novel automatically controlled operating assembly, generally designated as 158, is provided for rotating the turret assembly 126 between positions and for firmly holding the assembly steady so that the lenses 128 and 130 are held fixed with respect to the machine despite mechanical shocks and vibrations. The operating assembly 158 includes a reversible motor 160 having a shaft 161 coupled to the rotatable turret shaft 132 by a flexible and resilient shaft or coupling member 162 allowing the motor 160 to continue operation, i.e., to "overtravel," after the turret assembly 126 has engaged the stop members 148 or 150. Moreover, since the shaft 162 is resilient and flexible, overtravel operation of the motor 160 flexes the shaft 162 and causes the shaft firmly to urge the turret assembly 126 against its respective stop in order to securely hold the turret assembly 126 against vibrations or shocks.

More specifically, the drive motor 160 is mounted upon a mounting bracket 164 attached to the inclined wall 120a of the optics assembly housing 120. The shaft 161 of the motor 160 and the turret shaft 132 are connected to the ends of the flexible and resilient shaft 162 by a pair of coupling members 166. The shaft 162 has the characteristic of flexibility so that it may be twisted in either direction. In addition it has the property of resiliency so that it tends to return to its normal position, Although the shaft 162 may be constructed in several ways, in apparatus constructed in accordance with the invention a strong, tightly coiled spring was found to function in a desirable manner.

In accordance with a further feature of the invention a novel sensing and control assembly generally designated as 168 serves automatically to de-energize the motor 160 after a predetermined degree of overtravel relative to the turret assembly 126, and to hold the motor in its overtravel position. Assuming first that the machine has been used to make full size copies and the turret assembly 126 is in the position shown in FIG. 6, if it is now desired to produce reduced size copies the control circuit 56 functions in a manner described below to energize the motor 160 for rotation in the direction for moving the lens 130 into line with the aperture 144. When the lens 130 reaches the proper position, the abutment 154 reaches the stop 148 and the turret assembly 126 is held stationary. However, the motor shaft 161 continues to turn through an overtravel movement until a flat 170a on a cam 170 (FIG. 5) is engaged by a cam follower 178 controlling a switch 180. In accordance with the invention, and as will appear in connection with a discussion of the control circuit 56, operation of the switch 180 serves to de-energize the motor 160 so that the motor shaft stops operating.

In order to hold the motor in the overtravel position, an electrically operated brake 176 (FIGS. 2, 4 and 8) is mounted adjacent the motor 160. The brake 176 may be of any known construction and serves to hold the motor shaft 161 stationary when energized. The brake 176 is energized by operation of the switch 180 and, as a result, when the motor 160 is de-energized it is held in its overtravel position.

If the motor 160 is now energized to rotate the turret assembly 126 in the opposite direction toward the position shown in FIG. 6 for full size copy making operations, lens 128 is moved into line with aperture 144, and abutment 156 engages the stop 150 to stop the turret assembly. The motor shaft 161 continues to rotate through a predetermined degree of overtravel until a cam follower 172 engages the flat 170a on the cam 170 and operates a switch 174 in order to de-energize the motor 160 and energize the brake 176 thereby to hold the motor shaft 161 in its overtravel position.

The degree of overtravel may be selected as desired. In the illustrated embodiment the turret assembly 126 rotates approximately 90° between positions while the motor shaft 161 rotates about 180°, so that overtravel of about 45° takes place when the turret assembly is positioned.

In the reduction mode of operation, the reflected light image from the original is of reduced size and is confined to a central portion of the photoconductive, charged copy sheet passing the exposure station 22. As a result, the edge portions of the sheet are not completely exposed and in these regions the charge is not fully dissipated. In subsequent developing and fixing operations, developer powder may adhere to these edge portions and produce dark or "dirty" edge areas.

In order to overcome this problem and in accordance with a feature of the invention, there is provided a novel edge exposure assembly generally designated as 182 (FIG. 1) for fully exposing the edge regions of the copy sheet. Assembly 182 includes a masking plate 184 over which the exposed copy sheet passes after leaving the exposure station 22. The plate 184 includes a pair of apertures or slots 186 beneath which are disposed a pair of exposure lamps 188 and 190. As will appear hereinafter, the lamps 188 and 190 are normally de-energized, but are automatically energized when the machine is conditioned for reduces size copy making operations. The lamps serve completely to expose or "burn out" the edge portions of the sheet so that the adherence of developer material to these regions is prevented.

Proceeding now to a description of the control circuit 56 (FIG. 8) for controlling the operation of the automatic copy making machine, the circuit includes the single selector switch 58 for conditioning the machine either to produce full size or reduced size copies of the original. Operation of the switch 58, which may be a manually operated switch conveniently disposed at the front of the machine, is effective to control the drive system 28 to propel the original and copy sheet at either the same or at different speeds and to center the reduced copy on the copy sheet when reduced size copies are made. Furthermore, operation of the switch 58 controls the adjustable lens assembly 26 in order to project either a full size or a reduced size reflected light image onto the copy sheet. In addition, operation of the switch 58 controls the energization of the edge exposure lamps 188 and 190 in order to prevent the adherence of developer powder to the edges of the copy sheet in the reduction mode of operation.

The control circuit 56 may be supplied with power through a plug connector (not shown) and includes a common input terminal 200 and a nominal 115 volt AC input terminal 202, these being connected to a full wave rectifier bridge 204 used to provide a DC potential difference across a pair of DC power busses 206 and 208. The main drive motor 78 and the exposure lamp 54 are supplied from a nominal 230-volt AC input terminal 209.

Figure 8:
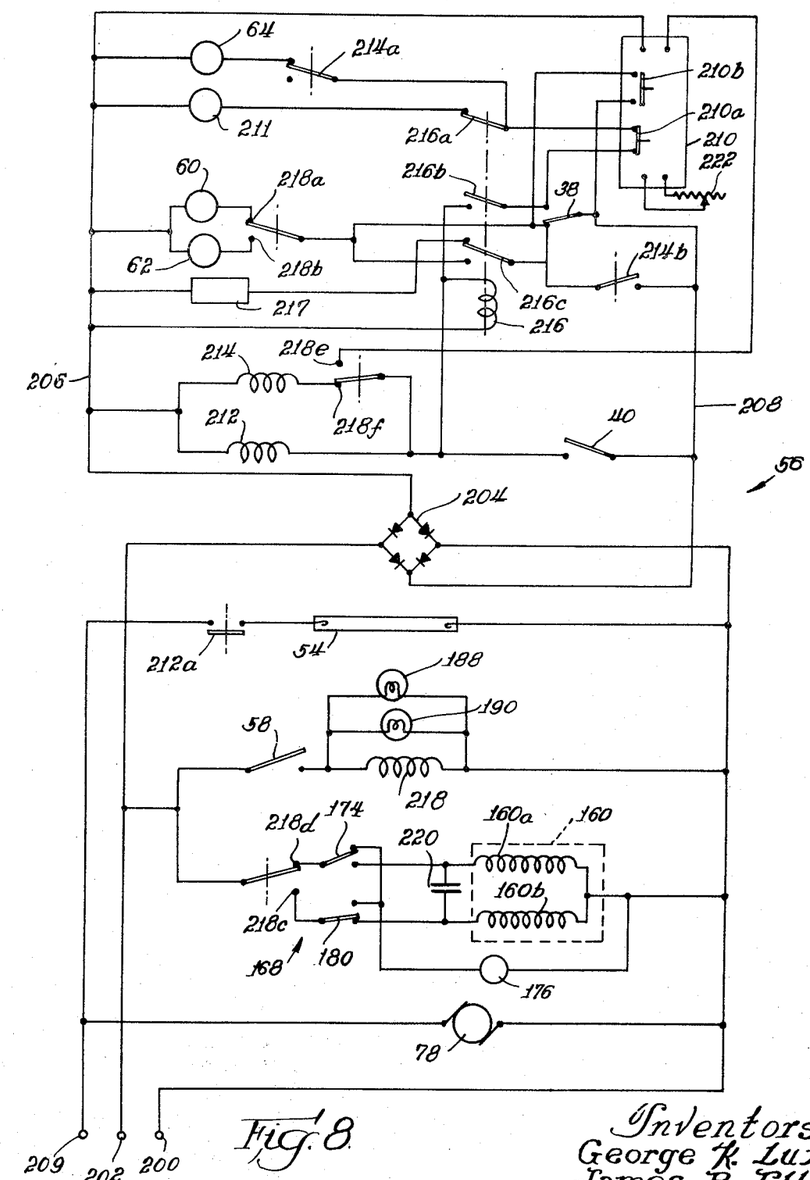
FIG. 8 is a schematic diagram of part of a circuit for controlling the operation of the machine.

As shown in FIG. 8, the control circuit 56 of the machine is in the standby condition ready to produce full size copies of originals fed to the machine. The selector switch 58 is open —i.e., in the position for making full size copies, and the main drive motor 78 is energized. The electric clutch 60 is energized by a circuit including the original sheet sensing switch 38, and as a result the original sheet drive rollers 30 and 32 and the copy sheet drive rollers 34 and 36 all rotate at the same speed.

The operation of making a full size copy of the original is begun by inserting an original sheet into the machine and the entire copy making process is completed automatically, after which the machine returns to the illustrated standby condition. When the leading edge of an original operates the original sheet sensing switch 38 from its illustrated position to its alternate position, the original is held stationary while a copy sheet is advanced toward the copy sheet drive roller 36. When the switch 38 moves to its alternate position, the circuit for energizing the clutch 60 is opened while a circuit is completed for energizing the brake 64 through a normally closed set of contacts 210a of a time delay relay 210. Simultaneously, a copy sheet supply clutch 211 (illustrated only in FIG. 8) is energized to advance a copy sheet from a stack or a roll.

When the leading edge of the copy sheet reaches the copy sheet sensing switch 40, the original and copy sheet are advanced in synchronism past the illumination station 20 and the exposure station 22, the exposure lamp 54 energized and the copy sheet supply clutch 211 is de-energized until the next copying operation. When the switch 40 closes, a circuit is completed for energizing a lamp relay 212, a relay 214 and a relay 216. A normally open set of contacts 212a close to complete a circuit for energizing the exposure lamp 54. A normally closed set of contacts 214a open to de-energize the brake 64 and a normally closed set of contacts 216a open to de-energize the copy sheet supply clutch 211. A normally open set of contacts 214b close to complete a circuit for energizing the clutch 60 and the original sheet and the copy sheet move in synchronism past the exposure and illumination stations 22 and 20. A normally open set of contacts 216b close to complete a holding circuit together with the original sheet sensing switch 38 in its alternate position for maintaining the relays 212, 214, and 216 energized until the original sheet clears the original sheet sensing switch 38.

When the original sheet and the copy sheet clear the sheet sensing switches 38 and 40, the control circuit 56 returns to the standby condition illustrated except that the exposure lamp 54 is maintained energized for a period of time while the original sheet completes its movement past the illumination station 20. This is accomplished by any suitable means such as the use of a slow release relay for the lamp relay 212. In addition, at the end of the copy making process when the relay 216 is de-energized, a normally closed set of contacts 216c reclose to provide an operating signal for suitable counting and indicating apparatus shown in block form and designated as 217.

In order to condition the machine for reduced size copy making operations, the selector switch 58 is moved by the user from its illustrated open position to its closed position. When the switch 58 is closed, the drive system 28 is conditioned for moving an original sheet past the illuminating station 20 faster than a copy sheet is moved past the exposure station 22, and for momentarily holding the original while the copy sheet advances thereby to center the reduced image on the copy sheet. In addition, the reduced size reproduction lens 130 is moved into position for reduced size copying operations, and the edge exposure lamps 188 and 190 are energized.

More specifically, when the switch 58 is closed a circuit is completed for connecting the edge exposure lamps 188 and 190 between the input terminals 200 and 202. In addition, a reduced size operating relay 218 is energized, and a normally closed set of contacts 218a are opened to disconnect the clutch 60 while a normally open set of contacts 218b are closed to energize the clutch 62. As a result, the original sheet drive rollers 30 and 32 commence to rotate at a faster speed than the copy sheet drive rollers 34 and 36.

Energization of the relay 218 also results in closing of a normally open set of contacts 218c and opening of a normally closed set of contacts 218d so that a circuit is completed through the closed switch 174 for energization of the turret assembly motor 160. The motor 160 is reversible and includes a pair of motor windings 160a and 160b in circuit with a phase lag capacitor 220. When the motor 160 is energized by connection of the winding 160b to the input terminal 202, the motor shaft 161 is rotated in the direction for moving the lens 130 into position for reduced size copying operations when the abutment 154 reaches the stop 148, and after a predetermined overtravel, the switch 174 opens to deenergize the motor 160 and to energize the brake 176 thereby to clamp the motor shaft 161 in position.

When the relay 218 is energized, a normally open set of contacts 218e are closed and a normally closed set of contacts 218f are opened in order to disconnect the relay 214 from the circuit and to condition the circuit for operation of the time delay relay 210. The relay 210 includes a time delay adjustment circuit including a variable resistor 322, and its operation is such that when the relay 210 is energized by closure of the copy sheet sensing switch 40, a predetermined time delay period passes after which the normally closed contacts 210a open and a normally open set of contacts 210b close. The time delay relay 210 staggers the movement of the original and the copy sheet through the machine so that the copy produced on the copy sheet is centered.

After the machine has been placed in standby condition for reduced size copy making conditions by closure of the switch 58, a reduced size copy may be made by inserting an original sheet into the machine until its leading edge operates the original sheet sensing switch 38. When this occurs, the clutch 62 is de-energized and the brake 64 together with the copy sheet supply clutch 211 are energized by a circuit including the normally closed contacts 210a of the time delay relay 210. When a copy sheet is fed from the copy sheet supply enclosure and its leading edge closes the copy sheet sensing switch 40, a circuit is completed for energizing the relays 212, 216 and 210. Energization of the relay 212 completes a circuit for energizing the exposure lamp 54 while energization of the relay 216 deenergizes the copy sheet supply clutch 211. However, since the relay 214 is not energized in reduced copy operation, the brake 64 remains energized through the contacts 210a and the clutch 62 remains de-energized so that the original is momentarily held stationary while the copy sheet moves into the exposure station 22.

After a predetermined time sufficient to center the copy image on the copy sheet, the time delay relay 210 operates and the normally open contacts 210b close to complete a circuit for energization of the clutch 62 while the normally closed contacts 210a open to deenergize the brake 64. At this time the original sheet begins to move into the illumination station 20 at a faster speed than the copy sheet is moving through the exposure station 22, and a reduced size copy is made on the center of the copy sheet. When the sheet sensing switches 38 and 40 are cleared, the relays 212, 216 and 210 are deenergized and the machine returns to its standby condition in the manner described previously in connection with full size copying operations.

Return of the machine to the condition for making full size copies is accomplished by reopening the selector switch 58. When this is done, the clutch 62 is deenergized and the clutch 60 is energized; the time delay relay 210 is disconnected and the relay 214 is connected; and the edge exposure lamps 188 and 190 are disconnected. In addition, the normally closed set of contacts 218d are reclosed so that a circuit is completed to the turret motor 160 through the closed switch 180 in order to connect the winding 160a to the input terminal 202 to rotate the turret assembly 126 back to its initial position. When the turret assembly reaches its position and when a predetermined overtravel of the motor 160 takes place, the switch 180 reopens as previously described in order to de-energize the motor 160 and to energize the brake 176.

Although the present invention has been described in connection with details of a particular embodiment, those skilled in the art may devise other embodiments and modifications falling within the spirit and scope of the invention. Accordingly, it should be understood that details of the described embodiment do not limit the invention except as set forth in the following claims.

What is claimed as new and desired to be secured by Letters Patent of the United States is:

1. A photoelectrostatic copying machine for making a copy of an original sheet on a copy sheet comprising:

an illumination station including means for illuminating the original sheet;

an exposure station for the copy sheet;

optical means for focusing a light image of the original sheet at the illumination station onto the copy sheet at the exposure station;

manual selector means operable to different conditions for conditioning the machine to produce full size and reduced size copies of the original;

control means operably associated with the optical means and controlled by the manual selector means for reducing the size of the reflected light image in response to operation of the manual selector means to its reduced size copy condition; and light means disposed adjacent said exposure station for illuminating marginal areas of the copy sheet adjacent the reduced size reflected light image;

said control means including means for operating said light means in response to operation of the manual selector means to its reduced size copy condition.

2. The machine of claim 1, said light means including first and second lamps each disposed to one side of the reflected light image and masking means disposed between each lamp and the central portion of the copy sheet.

3. The machine of claim 2, said control means including switch contacts movable to a closed condition in response to selection of reduced size copy operation, and circuit means connecting said lamps in series circuit relation with said switch contacts.

* * * * *